(12) United States Patent
Hei

(10) Patent No.: US 11,363,210 B2
(45) Date of Patent: *Jun. 14, 2022

(54) IN-VEHICLE DEVICE AND VEHICLE SEARCH SYSTEM

(71) Applicant: TOYOTA JIDOSHA KABUSHIKI KAISHA, Toyota (JP)

(72) Inventor: Yuichiro Hei, Fujimino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/174,737

(22) Filed: Feb. 12, 2021

(65) Prior Publication Data

US 2021/0168295 A1 Jun. 3, 2021

Related U.S. Application Data

(63) Continuation of application No. 16/502,505, filed on Jul. 31, 2019, now Pat. No. 10,951,830.

(30) Foreign Application Priority Data

Jul. 9, 2018 (JP) .............................. JP2018-129969

(51) Int. Cl.
*H04N 5/232* (2006.01)
*G06K 9/00* (2022.01)
(Continued)

(52) U.S. Cl.
CPC ........... *H04N 5/23299* (2018.08); *G06T 7/70* (2017.01); *G06V 20/56* (2022.01);
(Continued)

(58) Field of Classification Search
None
See application file for complete search history.

(56) References Cited

U.S. PATENT DOCUMENTS 4,740,045 A 4/1988 Goodson et al.
8,977,435 B2 3/2015 Kobana et al.
(Continued)

FOREIGN PATENT DOCUMENTS

JP H11-312300 A 11/1999
JP 2003-198903 A 7/2003
JP 2016-076142 A 5/2016

OTHER PUBLICATIONS

Mar. 18, 2020 U.S. Office Action issued U.S. Appl. No. 16/502,505.
(Continued)

*Primary Examiner* — Mohammad J Rahman
(74) *Attorney, Agent, or Firm* — Oliff PLC

(57) ABSTRACT

An in-vehicle device comprises a direction controller configured to perform control of switching a direction of an in-vehicle camera that photographs an outside of a vehicle to acquire an image to a first direction which is a direction toward a side in front of the vehicle and a second direction which is a direction toward a lane opposite a lane along which the vehicle is traveling; a recognizer configured to periodically recognize license plate information included in the image acquired continuously from the in-vehicle camera; a transmitter configured to transmit data related to the recognized license plate information to a server device, wherein the direction controller switches the direction of the in-vehicle camera facing the first direction to the second direction when the recognizer has continuously recognized the same license plate information for a predetermined period or more.

7 Claims, 12 Drawing Sheets

(51) Int. Cl.
*G06T 7/70* (2017.01)
*G06V 20/56* (2022.01)
*G06V 20/62* (2022.01)

(52) U.S. Cl.
CPC ............... *H04N 5/23206* (2013.01); *G06T 2207/30252* (2013.01); *G06V 20/625* (2022.01); *G06V 2201/07* (2022.01)

(56) References Cited

U.S. PATENT DOCUMENTS

| | | | |
|---|---|---|---|
| 9,948,853 | B2 | 4/2018 | Okude et al. |
| 2005/0169500 | A1 | 8/2005 | Takahashi et al. |
| 2005/0171688 | A1 | 8/2005 | Fujita et al. |
| 2005/0225636 | A1 | 10/2005 | Maemura et al. |
| 2006/0164258 | A1 | 7/2006 | Garibotto et al. |
| 2008/0048886 | A1 | 2/2008 | Brown et al. |
| 2009/0299857 | A1 | 12/2009 | Brubaker |
| 2010/0052947 | A1* | 3/2010 | Lin ................ G07C 9/00174 340/932.2 |
| 2012/0212617 | A1 | 8/2012 | Wang et al. |
| 2014/0200801 | A1 | 7/2014 | Tsuruta et al. |
| 2014/0207541 | A1* | 7/2014 | Nerayoff ............... G06V 20/52 382/104 |
| 2015/0262025 | A1* | 9/2015 | Yasui ................... H04N 7/181 348/142 |
| 2016/0006922 | A1 | 1/2016 | Boudreau et al. |
| 2016/0042622 | A1 | 2/2016 | Takiguchi et al. |
| 2016/0132743 | A1 | 5/2016 | Ekin |
| 2017/0075888 | A1 | 3/2017 | Ekin |
| 2017/0099436 | A1 | 4/2017 | Ono |
| 2017/0223314 | A1* | 8/2017 | Collings, III ...... H04N 5/23206 |
| 2017/0368987 | A1 | 12/2017 | Mega |
| 2018/0181819 | A1* | 6/2018 | Kawano ............... G06V 20/588 |
| 2018/0186288 | A1 | 7/2018 | Batten et al. |
| 2018/0204335 | A1 | 7/2018 | Agata et al. |
| 2018/0225963 | A1 | 8/2018 | Kobayashi et al. |
| 2018/0247540 | A1 | 8/2018 | Hagawa et al. |
| 2018/0365859 | A1 | 12/2018 | Oba et al. |
| 2019/0102840 | A1 | 4/2019 | Perl et al. |
| 2019/0164430 | A1 | 5/2019 | Nix |
| 2019/0204835 | A1* | 7/2019 | Cho ....................... G06V 20/58 |
| 2021/0024059 | A1* | 1/2021 | Miyamoto .......... B60W 10/184 |

OTHER PUBLICATIONS

Jul. 16, 2020 Office Action Issued in U.S. Appl. No. 16/502,505.
Nov. 16, 2020 Notice of Allowance Issued in U.S. Appl. No. 16/502,505.

* cited by examiner

IN-VEHICLE DEVICE AND VEHICLE SEARCH SYSTEM

CROSS REFERENCE TO THE RELATED APPLICATION

This application is a continuation of U.S. patent application Ser. No. 16/502,505, filed on Jul. 31, 2019, which claims the priority of Japanese Patent Application No. 2018-129969, filed on Jul. 9, 2018, the disclosures of each of which are hereby incorporated by reference herein in their entirety.

BACKGROUND

Technical Field

The present disclosure relates to a technology of searching for vehicles.

Description of the Related Art

License plate information is useful in searching for vehicles.

For example, Japanese Patent Application Publication No. 2016-076142 discloses a system for searching for vehicles using license plate information. Specifically, each vehicle in the system photographs vehicles around the host vehicle using an in-vehicle camera to obtain images and detects a search target vehicle on the basis of a recognition result of license plate information from the obtained images.

According to the system disclosed in Japanese Patent Application Publication No. 2016-076142, since the license plate information is collected using a camera mounted in a general vehicle traveling on a road, quick finding of a search target vehicle can be anticipated.

SUMMARY

An in-vehicle camera is generally fixed to a predetermined position in a vehicle such as a dashboard. The viewing field of an in-vehicle camera generally changes greatly depending on the installed position.

For example, the amount of obtained information may change from a case in which the in-vehicle camera is installed so as to face the same lane to a case in which the in-vehicle camera is installed so as to face an opposite lane. However, the conventional system does not take a method of installing an in-vehicle camera capable of acquiring a larger amount of license plate information into consideration.

The present disclosure has been made in view of the above-described problems and an object thereof is to provide an in-vehicle device capable of obtaining more chances to recognize license plate information.

The present disclosure in its one aspect provides an in-vehicle device comprising a direction controller configured to perform control of switching a direction of an in-vehicle camera that photographs an outside of a vehicle to acquire an image to a first direction which is a direction toward a side in front of the vehicle and a second direction which is a direction toward a lane opposite a lane along which the vehicle is traveling; a recognizer configured to periodically recognize license plate information included in the image acquired continuously from the in-vehicle camera; a transmitter configured to transmit data related to the recognized license plate information to a server device, wherein the direction controller switches the direction of the in-vehicle camera facing the first direction to the second direction when the recognizer has continuously recognized the same license plate information for a predetermined period or more.

The present disclosure in its another aspect provides a control method for causing an in-vehicle device to execute a direction control step of performing control of switching a direction of an in-vehicle camera that photographs an outside of a vehicle to acquire an image to a first direction which is a direction toward a side in front of the vehicle and a second direction which is a direction toward a lane opposite a lane along which the vehicle is traveling; a recognition step of periodically recognizing license plate information included in the image acquired continuously from the in-vehicle camera; a transmitting step of transmitting data related to the recognized license plate information to a server device, wherein in the direction control step, the direction of the in-vehicle camera facing the first direction is switched to the second direction when the same license plate information has been continuously recognized for a predetermined period or more in the recognition step.

According to a third aspect of the present disclosure, a program for causing a computer to execute the control method or a non-transitory computer-readable storage medium having the program stored therein is provided.

The present disclosure in its another aspect provides a vehicle search system comprising a vehicle; and a server device, wherein the vehicle includes an in-vehicle camera that photographs an outside of a vehicle to acquire an image; a direction controller configured to control a direction of the in-vehicle camera according to any one of a first mode in which the direction of the in-vehicle camera is determined on the basis of information acquired from the server device and a second mode in which the direction of the in-vehicle camera is determined autonomously; a recognizer configured to recognize license plate information included in the image acquired from the in-vehicle camera; and a transmitter configured to transmit data related to the recognized license plate information to the server device together with position information, and the server device includes a storage unit configured to store the data related to the license plate information transmitted from the vehicle in correlation with the position information; and a determiner configured to transmit information that designates whether the direction of the in-vehicle camera is to be controlled according to the first mode or the second mode to the vehicle on the basis of the stored data.

According to the present disclosure, it is possible to provide an in-vehicle device capable of obtaining more chances to recognize license plate information.

DESCRIPTION OF THE EMBODIMENTS

Figure 1:
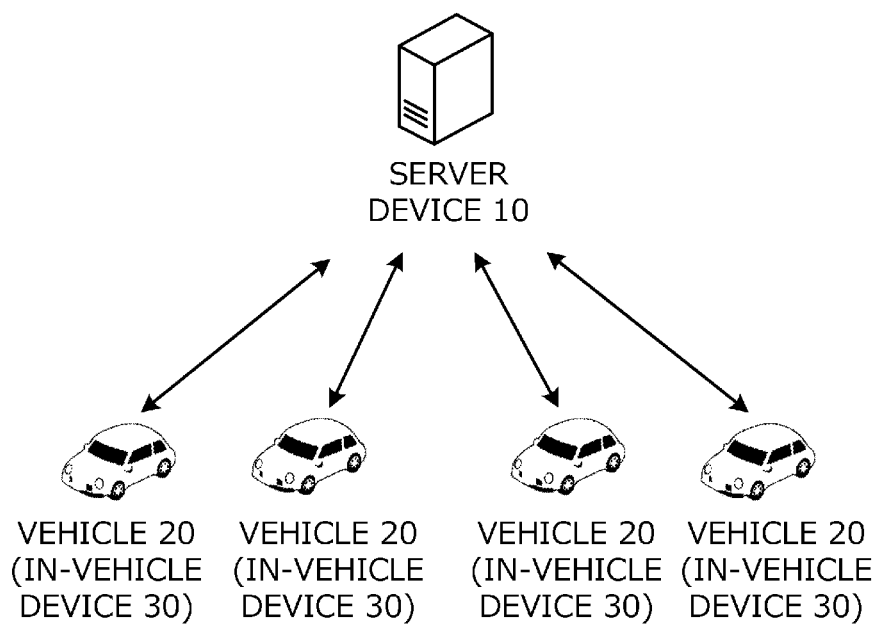
FIG. 1 is a schematic diagram of a vehicle search system according to an embodiment.

An in-vehicle device according to the present disclosure performs a process of acquiring an image using a camera that photographs the outside of a vehicle and recognizing license plate information included in the image every predetermined periods. The license plate information can be recognized according to a known method.

In the in-vehicle device, which direction the camera is mounted to face is a question. For example, when the camera is fixed so as to face a traveling direction, although it is possible to grasp the license plate of a preceding vehicle traveling in the same lane, since the viewing field for an opposite lane narrows, the recognition accuracy of the license plate information of a vehicle traveling in the opposite lane decreases. On the other hand, when the camera is fixed so as to face the opposite lane, although it is possible to grasp vehicles traveling in the opposite lane for a longer period, it is difficult to grasp the license plate of a vehicle traveling in the same direction as a host vehicle.

Therefore, an in-vehicle device according to the present disclosure is configured so that the direction of an in-vehicle camera can be dynamically switched between a first direction which is a direction toward the side in front of a vehicle and a second direction which is a direction toward a lane opposite a traveling lane of the vehicle. The direction of the in-vehicle camera may be switched by physically rotating a lens and may be switched optically, for example.

Moreover, when the license plate information included in images acquired successively is recognized periodically and the same license plate information is continuously recognized for a predetermined period or more, the direction of the in-vehicle camera facing the first direction is switched to the second direction.

That is, when the same vehicle is successively present in the viewing field of the in-vehicle camera, the direction of the in-vehicle camera is switched to a direction in which it is possible to observe the opposite lane rather than the same lane.

According to this configuration, in a situation in which new license plate information is not obtained such as when a host vehicle is present in the middle of a row of vehicles, for example, it is possible to obtain a chance to acquire new license plate information.

Moreover, the in-vehicle device according to the present disclosure further includes a receiver configured to receive direction designation information which is information that designates a direction of the in-vehicle camera, and when the direction designation information is received from the server device, the direction of the in-vehicle camera may be switched according to the direction designation information.

In this manner, the in-vehicle device may have an operation mode in which a photographing direction is determined on the basis of an instruction from a server device in addition to an operation mode in which the photographing direction is determined autonomously.

For example, when a vehicle that is to be grasped by the in-vehicle camera is present at a specific position, the server device may transmit an instruction to a neighboring vehicle traveling around the vehicle so that the in-vehicle camera of the neighboring vehicle faces a specific direction.

When a predetermined period has elapsed after the direction of the in-vehicle camera was switched to the second direction, the direction of the in-vehicle camera may be switched to the first direction.

According to this configuration, it is possible to efficiently obtain the license plate information of vehicles traveling in both the same lane and the opposite lane.

Moreover, the in-vehicle device according to the present disclosure may be configured to be able to switch between a first operation mode in which the direction of the in-vehicle camera is determined on the basis of a command acquired from the server device and a second operation mode in which the direction of the in-vehicle camera is determined autonomously. The operation mode can be switched on the basis of an instruction from the server device.

Hereinafter, specific embodiments of the present disclosure will be described on the basis of the drawings. The hardware configuration, the modular configuration, the functional configuration, and the like described in the respective embodiments are not intended to limit the technical scope of the present disclosure, unless particularly stated otherwise.

First Embodiment

An overview of a vehicle search system according to a first embodiment will be described with reference to FIG. 1. The vehicle search system according to the present embodiment includes a server device 10 and an in-vehicle device 30 mounted on each of a plurality of vehicles 20. The server device 10 is a device that manages the plurality of vehicles 20 under the control thereof. The in-vehicle device 30 is an in-vehicle terminal that can communicate with the server device 10 and can execute functions to be described later. Although one server device 10 is illustrated in FIG. 1, a number of server devices 10 may be provided. For example, a plurality of server devices 10 that cover different regions may be provided.

The in-vehicle device 30 according to the present embodiment has a function of acquiring an image of a vehicle outside using a camera mounted in the vehicle 20 and recognizing license plate information of a vehicle (hereinafter, an other vehicle) present around the vehicle 20. The recognized license plate information is encoded and is transmitted to and stored in the server device 10 together with the position information of the vehicle 20. In this way, the server device 10 can grasp the rough position of a vehicle having the recognized license plate information.

When a specific vehicle is searched for, the server device 10 specifies a location at which a vehicle (hereinafter, a search target vehicle) which is a target of search by referring to the stored information and transmits a command (hereinafter, a search command) for searching for the vehicle to the vehicles 20 traveling in the vicinity thereof. The in-vehicle device 30 having received the search command continues recognizing the license plate information, and upon finding the search target vehicle, notifies the server device 10 of the fact.

The in-vehicle camera included in the vehicle 20 has a predetermined viewing field.

Figure 2B:
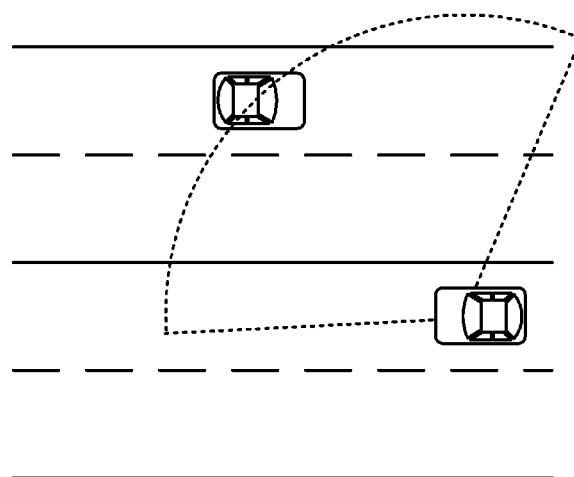
FIGS. 2A and 2B are diagrams illustrating a viewing field of an in-vehicle camera.
Figure 2A:
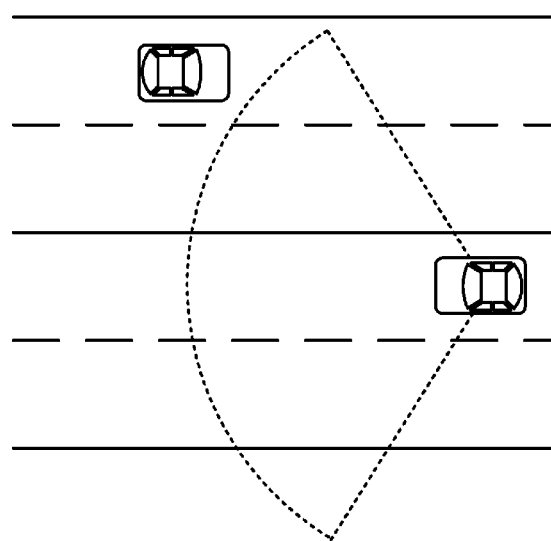

FIGS. 2A and 2B are diagrams illustrating a positional relation between the vehicle 20 and other vehicle. A dot line indicates an effective viewing field (a range where license plate information can be recognized effectively) of the in-vehicle camera mounted in the vehicle 20. In the present specification, the viewing field of an in-vehicle camera indicates an effective viewing field.

The accuracy of recognition of license plate information performed by the in-vehicle device 30 changes depending on the direction of an in-vehicle camera. For example, when the in-vehicle camera is fixed so as to face a traveling direction as in FIG. 2A, although it is possible to grasp the license plate of a preceding vehicle traveling in the same lane, since the viewing field for an opposite lane narrows, the recognition accuracy of the license plate information of a vehicle traveling in the opposite lane decreases.

On the other hand, when the in-vehicle camera is fixed so as to face the opposite lane as in FIG. 2B, although it is possible to grasp vehicles traveling in the opposite lane for a longer period, it is difficult to grasp the license plate of a vehicle traveling in the same direction as a host vehicle.

In the vehicle search system according to the first embodiment, in order to solve the above-mentioned problem, the in-vehicle device 30 changes the direction of the in-vehicle camera dynamically on the basis of the recognition result of the license plate of the other vehicle in the viewing field of the in-vehicle camera.

In the following description, a direction in which an optical axis of a lens included in the in-vehicle camera faces is referred to as a "photographing direction". Moreover, the direction of an optical axis of the lens included in the in-vehicle camera will be referred to simply as the "direction of the in-vehicle camera".

Next, a configuration of the server device 10 will be described.

The server device 10 is configured using a computer (an information processing device) including an arithmetic processing device such as a central processing unit or a microcomputer, a main storage device such as a RAM, an auxiliary storage device such as SSD or HDD, an input device such as a keyboard, a mouse, or a touch panel, an output device such as a display or a speaker, and a communication device that performs cable communication or radio communication. The server device 10 may be configured using one computer and may be configured by cooperation of a plurality of computers.

The server device 10 provides the following functions when a computer program stored in an auxiliary storage device is loaded into a main storage device and an arithmetic processing device executes the computer program. Some or all of these functions may be realized by a dedicated hardware device.

Figure 3:
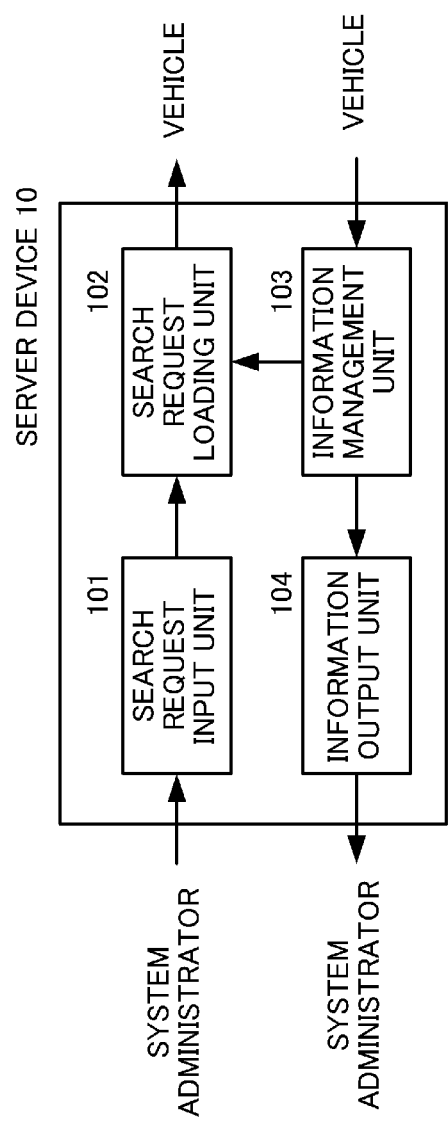
FIG. 3 is a diagram illustrating functional modules of a server apparatus according to a first embodiment.

The server device 10 realizes a search request input unit 101, a search request loading unit 102, an information management unit 103, and an information output unit 104 as illustrated in FIG. 3 when the arithmetic processing device executes a program.

The search request input unit 101 is a unit for acquiring license plate information of a search target vehicle from a system administrator.

The search request loading unit 102 is a unit for transmitting a command (hereinafter, a search command) for requesting searching the search target vehicle to a vehicle.

The information management unit 103 is a unit for acquiring and storing a digest (to be described later) from a vehicle.

The information output unit 104 is a unit for notifying a system administrator of information related to a search result.

Next, a configuration of the in-vehicle device 30 will be described.

The in-vehicle device 30 according to the first embodiment is a computer including a processor such as a CPU or a GPU, a main storage device such as a RAM or a ROM, and an auxiliary storage device such as an EPROM, a hard disk drive, or a removable medium. An operating system (OS), various programs, various tables, and the like are stored in the auxiliary storage device, the program stored therein is loaded into a work area of the main storage device and is executed, and the respective configuration units are controlled by execution of the program, whereby the respective functions matching a predetermined purpose as will be described later can be realized. However, some or all of the functions may be realized by a hardware circuit such as an ASIC or an FPGA.

Figure 4:
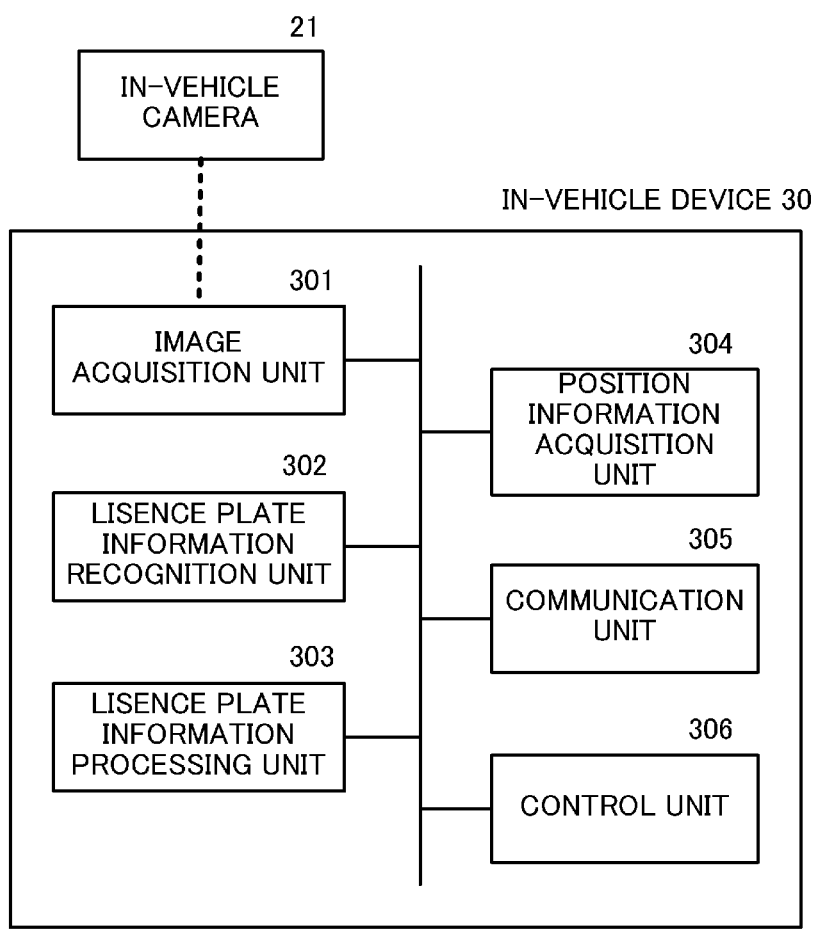
FIG. 4 is a diagram illustrating functional modules of an in-vehicle device according to the first embodiment.

FIG. 4 is a diagram illustrating the functional modules of the in-vehicle device 30 according to the first embodiment.

The in-vehicle device 30 according to the first embodiment includes an image acquisition unit 301, a license plate information recognition unit 302, a license plate information processing unit 303, a position information acquisition unit 304, a communication unit 305, and a control unit 306.

The image acquisition unit 301 is a unit for acquiring an image around the vehicle 20 using the in-vehicle camera 21 which is a camera mounted in the vehicle 20. The in-vehicle camera 21 is preferably provided at a position at which the camera is likely to face the license plate of the other vehicle such as the front side or the rear side of a vehicle, for example.

The in-vehicle camera 21 is configured such that a lens thereof can rotate about an axis orthogonal to the road. Specifically, as illustrated in FIGS. 2A and 2B, the in-vehicle camera 21 can switch a photographing direction to a first direction which is a direction facing the side in front of the vehicle 20 and a second direction which is a direction facing the opposite lane. The photographing direction may be changed by physically rotating the lens and may be changed by an optical means. For example, the photographing direction may be changed by moving an optical member such as a mirror. The photographing direction is controlled by the control unit 306 to be described later via the image acquisition unit 301.

The license plate information recognition unit 302 is a unit for determining whether a license plate of a vehicle is present in the image acquired by the image acquisition unit 301 and recognizing character information (license plate information) included in the license plate. The recognition process of the character information of the license plate can be performed according to a known arbitrary method (algorithm).

The license plate information processing unit 303 is a unit for encoding the license plate information recognized by the license plate information recognition unit 302 and converting (encoding) the license plate information into a format appropriate for transmission to the outside. In the present embodiment, the license plate information processing unit 303 converts all pieces of detected license plate information to a fixed-length (m-bit) bit string (referred to as a digest). A specific method will be described later.

The position information acquisition unit 304 is a unit for acquiring position information of a vehicle and is typically configured to include a GPS receiver or the like. The information acquired by the position information acquisition unit 304 is transmitted to the control unit 306 to be described later.

The communication unit 305 is a communication interface for connecting the in-vehicle device 30 to a network. The communication unit 305 is configured to include a radio communication circuit for performing radio communication, for example. The communication standard used by the communication unit 305 may use a mobile communication network such as 3G or LTE.

The control unit 306 is a unit for controlling the in-vehicle device 30. The control unit 306 controls execution of the above-described respective modules to acquire images, recognize the license plate information, encode the license plate information, transmit the digest. Moreover, the control unit 306 controls the photographing direction of the in-vehicle camera 21 on the basis of the recognized license plate information (the control unit 306 is a direction controller). The detailed method will be described later. Here, the control unit 306 may execute processes other than the process related to recognition of the license plate information.

Next, a specific method of determining the photographing direction will be described.

Figure 5:
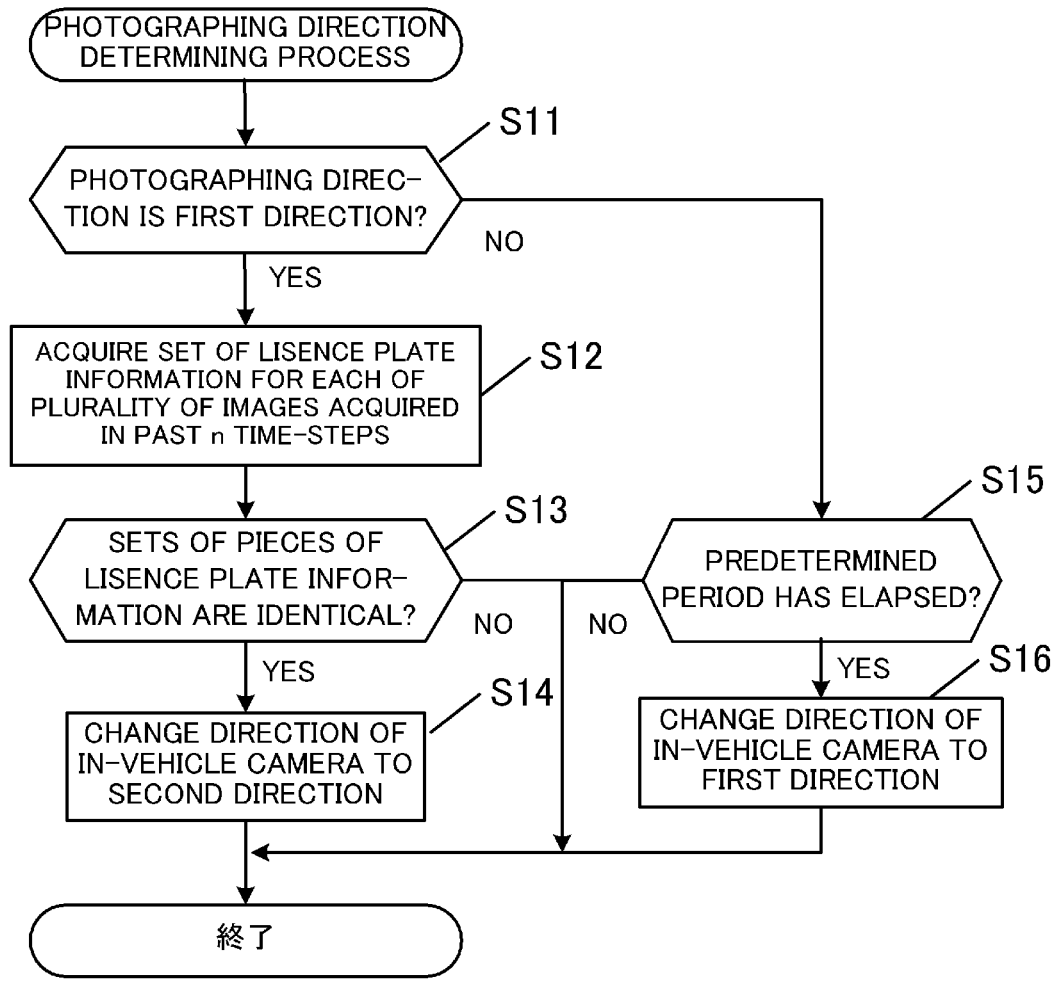
FIG. 5 is a flowchart of a process in which the in-vehicle device determines a photographing direction.

In the present embodiment, the in-vehicle device 30 acquires images from the in-vehicle camera 21 periodically and determines the photographing direction of the in-vehicle camera 21 on the basis of a plurality of acquired images. FIG. 5 is a flowchart of a process of determining the photographing direction. This process is executed periodically. A specific execution timing will be described later.

In this example, it is assumed that the image acquisition unit 301 acquires images from the in-vehicle camera 21 at predetermined periods and stores the images in an internal memory.

First, in step S11, it is determined whether the present photographing direction is the first direction. When the present photographing direction is the first direction, the flow proceeds to step S12.

In step S12, a set of pieces of license plate information are acquired for each of a plurality of images acquired from time t to time t+n. Here, time t may be the present time point and may be a past time point (for example, a time point which is n time-steps before the present time point). In this way, n sets of pieces of license plate information are obtained.

Subsequently, in step S13, it is determined whether all sets of pieces of license plate information acquired from time t to time t+n are identical. Here, when a positive determination result is obtained, it means that the other vehicle present in the viewing field of the in-vehicle camera in the n time-steps has not moved.

In such a case, since it is estimated that the in-vehicle camera 21 continues grasping the same other vehicle or the other vehicle is not present, it is preferable to set the direction of the in-vehicle camera so as to face the opposite lane. When a positive determination result is obtained in step S13, a process of setting the photographing direction to face the opposite lane is performed (step S14). When a negative determination result is obtained in step S13, the photographing direction is maintained.

The processes of steps S12 to S14 are examples, and a method other than the illustrated method may be used as long as it is possible to obtain a change over time in a plurality of pieces of license plate information included in the image. For example, a license plate recognized in an image may be tracked for respective frames to calculate a duration of each license plate in the viewing field of the in-vehicle camera and it may be determined whether the photographing direction will be changed to the second direction on the basis of a representative value of the duration.

Moreover, the rate of change in the set of pieces of license plate information from time t to time t+n may be calculated and the photographing direction may be changed to the second direction when the rate of change is lower than a threshold.

When it is determined in step S11 that the present photographing direction is the second direction, the flow proceeds to step S15.

In step S15, it is determined whether a predetermined period has elapsed after the direction of the in-vehicle camera 21 is changed to the second direction. Here, when the predetermined period (for example, 10 seconds, 30 seconds, 1 minute, or the like) has elapsed, the flow proceeds to step S16 and the photographing direction is changed to the first direction.

When a predetermined period has not elapsed, the flow ends and it is waited until the next determination timing.

Next, a main process performed by the in-vehicle device 30 will be described.

The process performed by the in-vehicle device 30 can be divided into a phase (collection phase) of collecting license plate information and a phase (search phase) of searching for a specific search target vehicle on the basis of a search command received from the server device 10.

First, a collection phase, that is, a process in which the in-vehicle device 30 recognizes license plate information of a neighboring vehicle present around the host vehicle to generate a digest and transmitting the digest to the server device 10 will be described.

Figure 6:
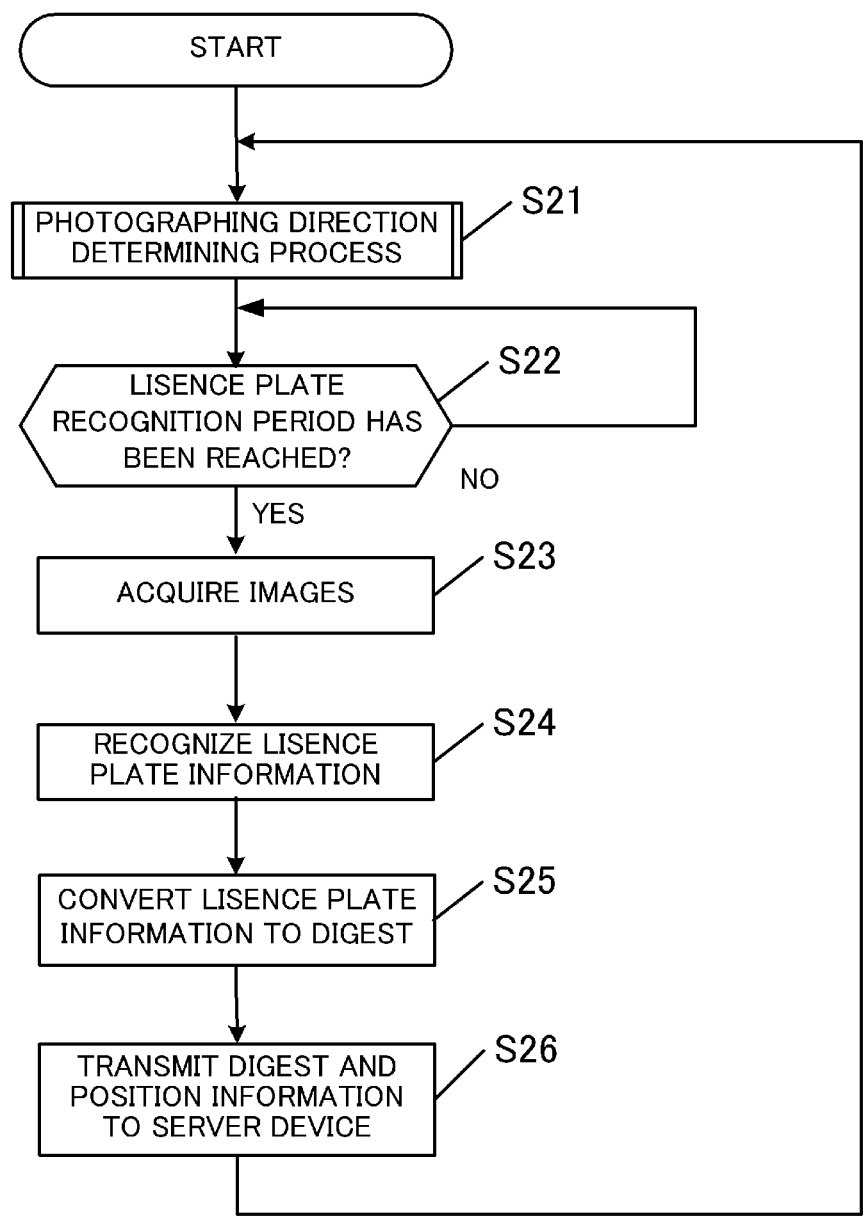
FIG. 6 is a flowchart of a process performed by the in-vehicle device in a collection phase.

FIG. 6 is a flowchart of a process performed by the in-vehicle device 30 (the control unit 306) in the collection phase. The in-vehicle device 30 executes the collection phase when a search command is not received.

First, as described above, in step S21, a process of determining the photographing direction on the basis of a plurality of images acquired in the past is performed. That is, in step S21, the process illustrated in FIG. 5 is executed.

Subsequently, in step S22, it is determined whether a period (a recognition period) of recognizing the license plate information has been reached. The recognition period may use a design value (for example, 100 milliseconds).

Here, when the recognition period has not been reached, it is waited until the next period has been reached. During the waiting, another process (a process which is not related to recognition of a license plate) may be executed.

When the recognition period has been reached, the latest image acquired by the image acquisition unit 301 and stored in the memory is read in step S23.

Subsequently, in step S24, the license plate information recognition unit 302 recognizes the license plate information included in an image. For example, a region in which a license plate is present is clipped by template matching and a character information recognition process is performed on the clipped region. In this step, the license plate information may be recognized using a known method.

In step S25, the license plate information processing unit 303 converts the license plate information obtained as the result of recognition to a digest. Specifically, k hash functions $h_1$ to $h_k$ are applied to license plate information (denoted by x) to calculate k hash values $h_1(x)$ to $h_k(x)$. The hash functions $h_1$ to $h_k$ are functions that converts arbitrary license plate information to an integer of 0 to m−1.

By performing such a process, it is possible to encode the license plate information and to improve confidentiality. These hash functions are stored in the license plate information processing unit 303, and common hash functions are used for all in-vehicle device 30 and all server devices 10. In this way, it is possible to verify whether the target digest corresponds to the license plate information of the search target vehicle.

In this example, although a digest is generated from a single piece of license plate information, the digest may be one in which a plurality of pieces of license plate information are superimposed. For example, a plurality of digests may be combined using a bloom filter. With this configuration, it is possible to verify whether the license plate information of a search target vehicle is included in the target digest.

The digest generated in step S25 is transmitted to the server device 10 via the communication unit 305 together with the position information of the vehicle 20 acquired by the position information acquisition unit 304 (step S26).

The transmitted digest is stored in the server device 10 (the information management unit 103) in a state of being correlated with the position information of the vehicle 20 and is provided for vehicle search.

Figure 7:
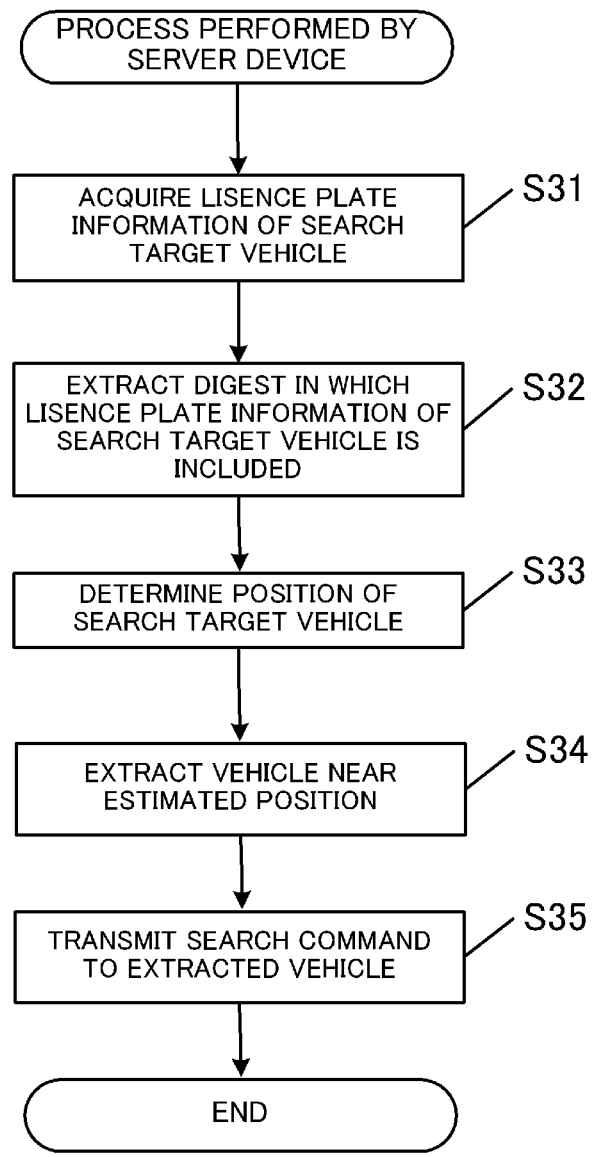
FIG. 7 is a flowchart of a process performed by the server device when searching for a vehicle.

FIG. 7 is a flowchart of a process performed by the server device 10 when searching for vehicles.

First, in step S31, a system administrator inputs information indicating that a system administrator searches for a specific vehicle to the search request input unit 101. In this case, the search request input unit 101 acquires license plate information of the search target vehicle.

Subsequently, in step S32, the search request loading unit 102 extracts a digest including the designated license plate information by referring to a plurality of digests collected from the plurality of in-vehicle devices 30 and stored therein. This process can be performed by comparing the designated license plate information with the result obtained by converting the license plate information according to the method performed in step S25.

When the digest including the designated license plate information is specified, the search request loading unit 102 estimates the position of a vehicle having the license plate information (step S33).

Subsequently, in step S34, the search request loading unit 102 extracts a vehicle 20 traveling in an area near the estimated position.

Finally, in step S35, a search command including the license plate information is transmitted to the vehicle 20.

Figure 8:
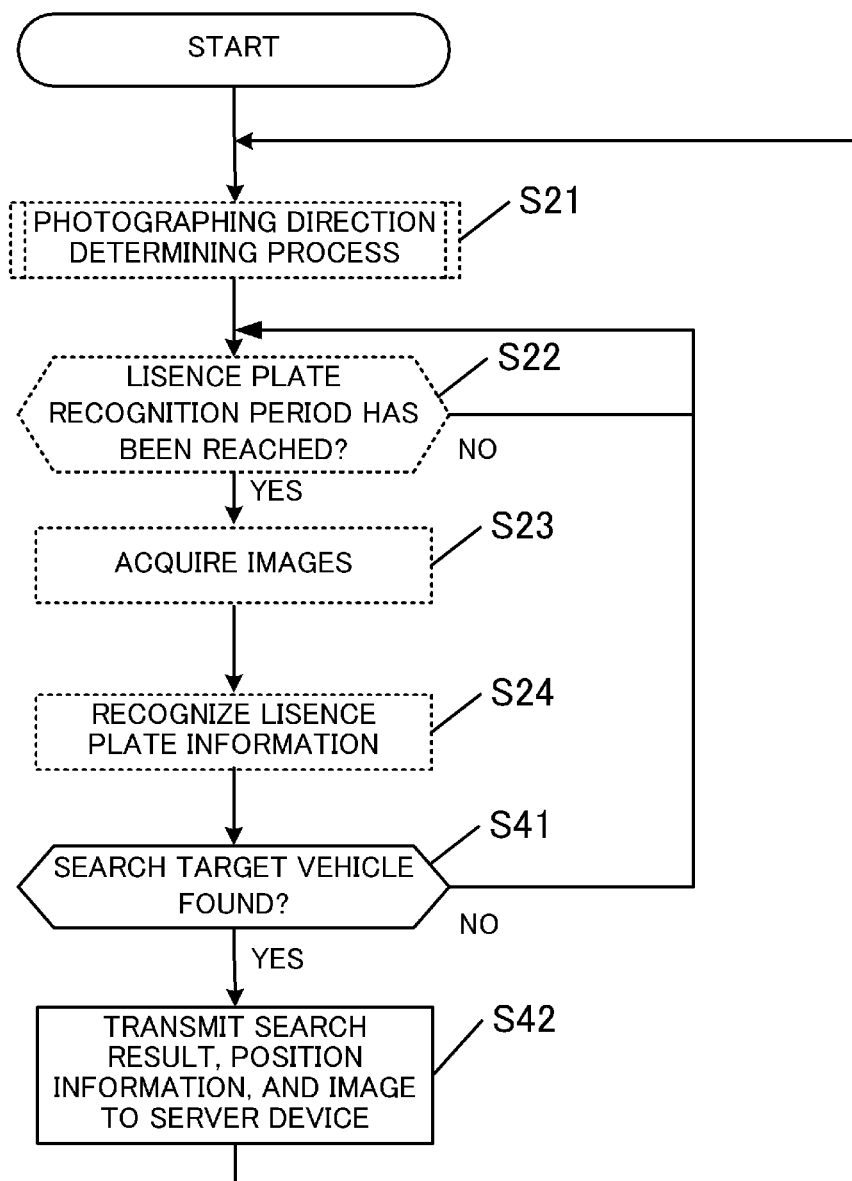
FIG. 8 is a flowchart of a process performed by the in-vehicle device in a search phase.

FIG. 8 is a flowchart of a process (the search phase) performed by the in-vehicle device 30 (the control unit 306) having received the search command. The search phase is different from the collection phase in that although recognition of license plate information is performed periodically similarly to the collection phase, when matching with the license plate information included in the search command is detected, the server device 10 is notified of the detection. Since the steps indicated by dot lines are similar to those of the collection phase, the detailed description thereof will be omitted.

In the collection phase, when a search target vehicle is found (step S41: Yes), the notification of the finding of the search target vehicle, the position information of the vehicle 20, and the image acquired by the in-vehicle camera are transmitted to the server device 10 (step S42). When the notification of the finding of the search target vehicle is transmitted to the server device 10, the information output unit 104 outputs the received image and the present position of the search target vehicle. In this way, the system administrator can grasp the present situation of the search target vehicle.

Figure 9:
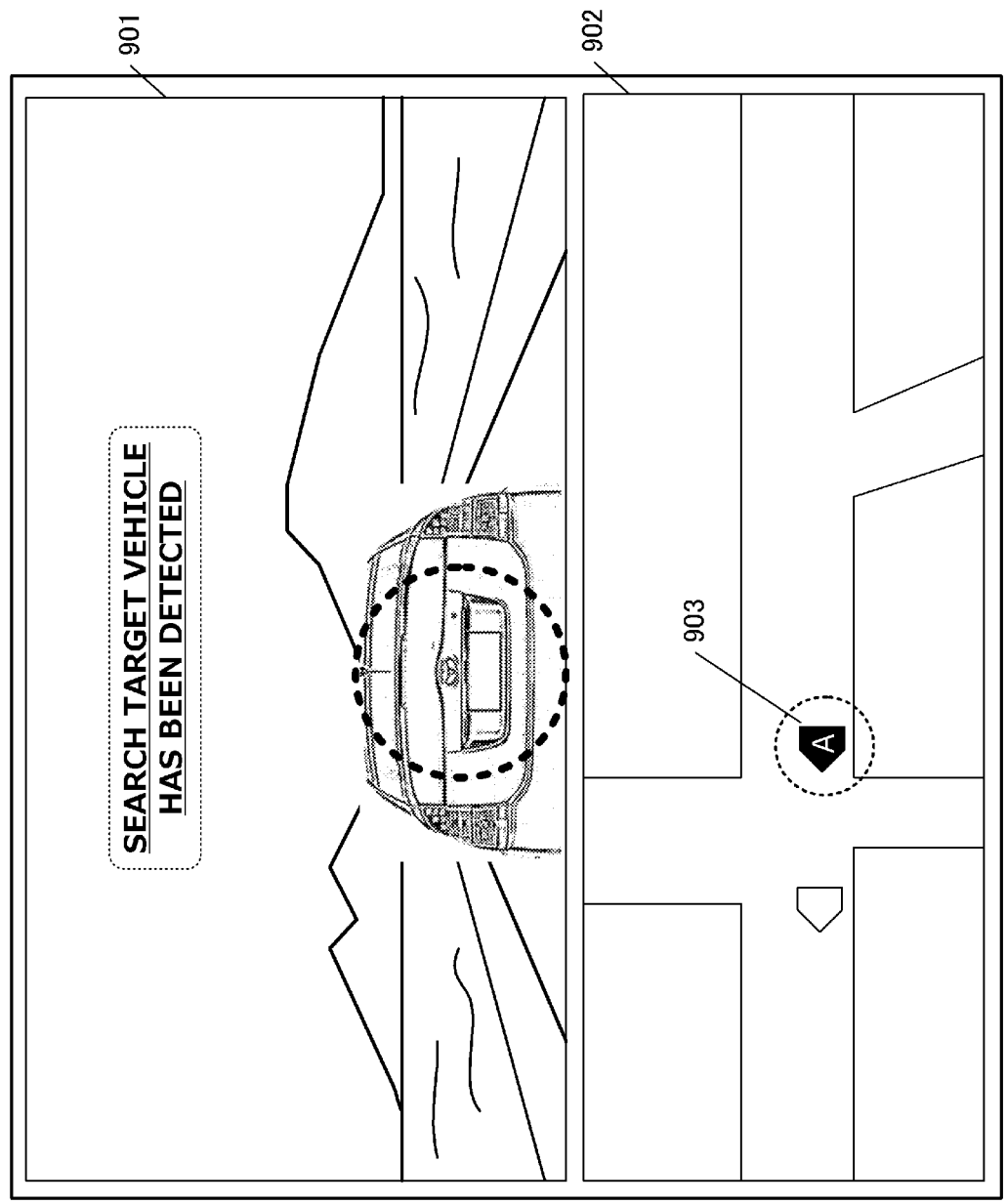
FIG. 9 is an example of a user interface provided to a system administrator.

FIG. 9 is an example of a user interface screen provided to the system administrator. In this example, a real-time image grasped by the in-vehicle camera 21 is displayed in the upper part (reference numeral 901), and a map and the position information (reference numeral 903) of the vehicle 20 are displayed in the lower part (reference numeral 902).

As described above, according to the first embodiment, in a system that searches for vehicles on the basis of license plate information read by an in-vehicle device, it is possible to increase the number of chances that the in-vehicle device 30 recognizes the license plate information. In this way, as compared to a case in which the direction of the in-vehicle camera is fixed, it is possible to improve the probability of finding a search target vehicle.

Second Embodiment

In the first embodiment, the in-vehicle device 30 determines the photographing direction autonomously. On the other hand, it may be preferable to fix the photographing direction depending on the positional relation with respect to the search target vehicle.

Figure 10:
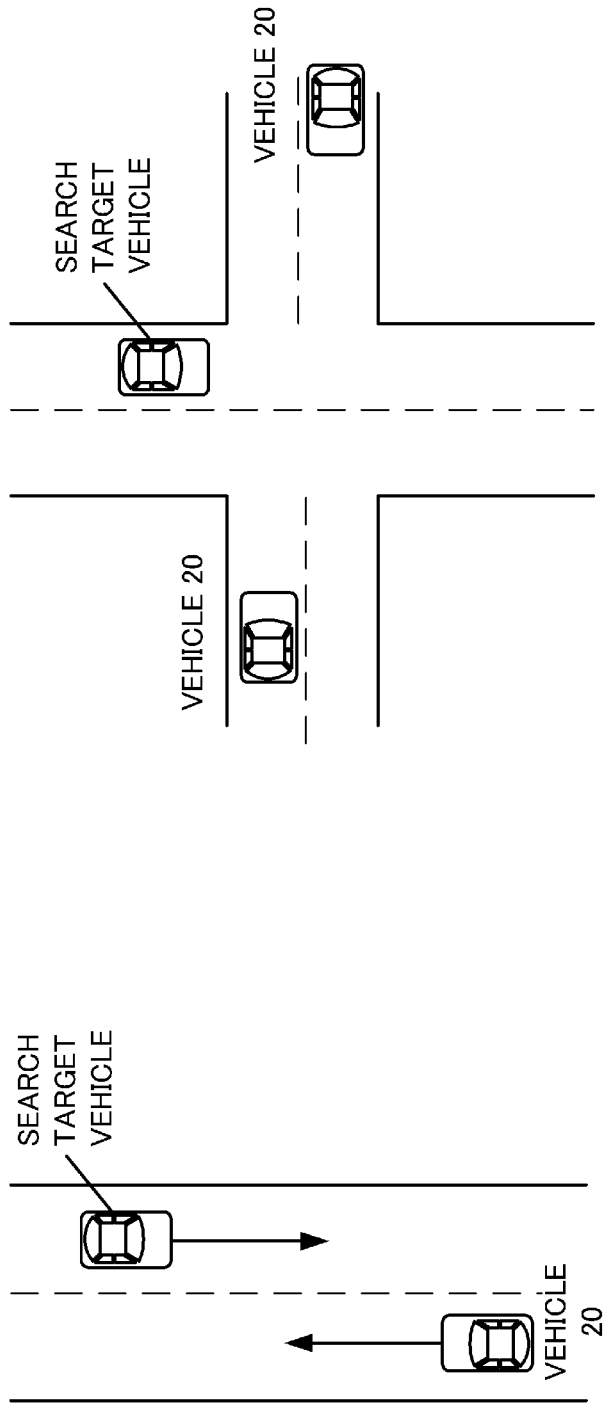
FIGS. 10A to 10C are diagrams illustrating a relative position of a vehicle 20 and a search target vehicle.

For example, as illustrated in FIG. 10A, when an estimated moving direction of a search target vehicle faces the vehicle 20, it is preferable to fix the in-vehicle camera mounted in the vehicle 20 so as to face the opposite lane. Similarly, as illustrated in FIG. 10B, when the search target vehicle and the vehicle 20 travel in a direction closer to each other, it is preferable to fix the in-vehicle camera mounted in the vehicle 20 so as to face the opposite lane.

Moreover, as illustrated in FIG. 10C, when an estimated moving direction of the search target vehicle is the same as the moving direction of the vehicle 20, it is preferable to fix the in-vehicle camera mounted in the vehicle 20 so as to face the same lane.

On the other hand, when the search target vehicle and the vehicle 20 travel in a direction away from each other, it is preferable to do not fix the photographing direction.

In the second embodiment, in order to deal with such a case, the server device 10 performs control of issuing a photographing direction instruction to the vehicle 20 that transmits the search command on the basis of a positional relation (a relative position) between the vehicle 20 and the search target vehicle.

In the present embodiment, a mode in which the photographing direction is determined on the basis of an instruction from the server device 10 will be referred to as a server mode (a first mode), and a mode in which each in-vehicle device 30 determines the photographing direction autonomously will be referred to as an autonomous mode (a second mode). Whether the in-vehicle device 30 operates in the server mode or the autonomous mode is determined by the server device 10. Moreover, when the in-vehicle device 30 operates in the server mode, information that indicates the photographing direction is transmitted from the server device 10 to the in-vehicle device 30.

Figure 11:
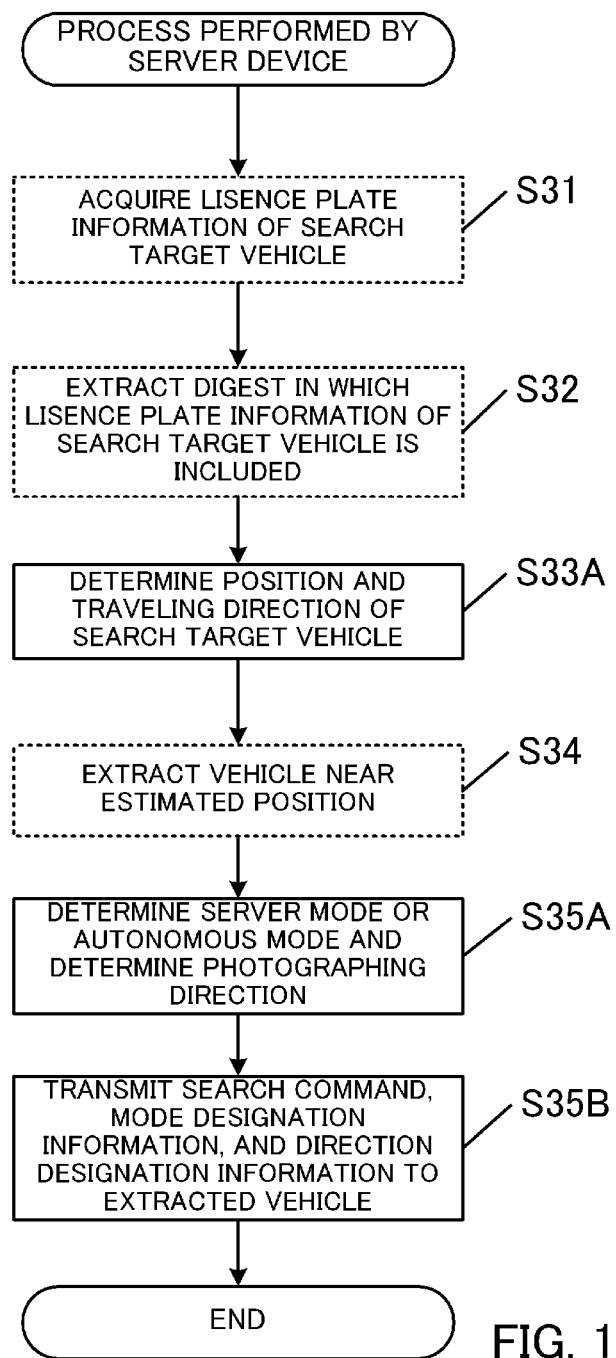
FIG. 11 is a flowchart of a process performed by the server device when searching for a vehicle according to the first embodiment.

FIG. 11 is a flowchart of a process performed by the server device 10 when searching for vehicles according to the second embodiment. Since the steps indicated by dot lines are similar to those of the first embodiment, the detailed description thereof will be omitted.

In the second embodiment, when the position of the search target vehicle is estimated in step S33, the traveling direction of the search target vehicle is also estimated (indicated by step S33A). The traveling direction of the search target vehicle can be estimated on the basis of a plurality of digests acquired with a time difference.

Moreover, it is determined whether the in-vehicle device 30 mounted in the vehicle 20 will operate in the server mode or the autonomous mode is determined on the basis of the positional relation between the vehicle 20 and the search target vehicle (step S35A).

Specifically, when the vehicle 20 that transmits a search command and the search target vehicle move in a direction closer to each other or move in the same direction, it is determined that the in-vehicle device 30 mounted in the vehicle 20 is to be operated in the server mode. Moreover, when the vehicle 20 that transmits a search command and the search target vehicle move in a direction away from each other, it is determined that the in-vehicle device 30 mounted in the vehicle 20 is to be operated in the autonomous mode. In this step, information that designate the mode (mode designation information) is generated.

Furthermore, when the in-vehicle device 30 operates in the server mode, the photographing direction of the in-vehicle camera included in the vehicle 20 is determined.

Specifically, when the vehicle 20 that transmits a search command and the search target vehicle move in the same direction, it is determined that the first direction is the photographing direction. Moreover, when the vehicle 20 and the search target vehicle move in a direction closer to each other, it is determined that the second direction is the photographing direction. In this step, information that designates the photographing direction (direction designation information) is generated.

The generated search command, the mode designation information, and the direction designation information are transmitted to the in-vehicle terminal 30 mounted in the target vehicle 20 in step S35B.

Figure 12:
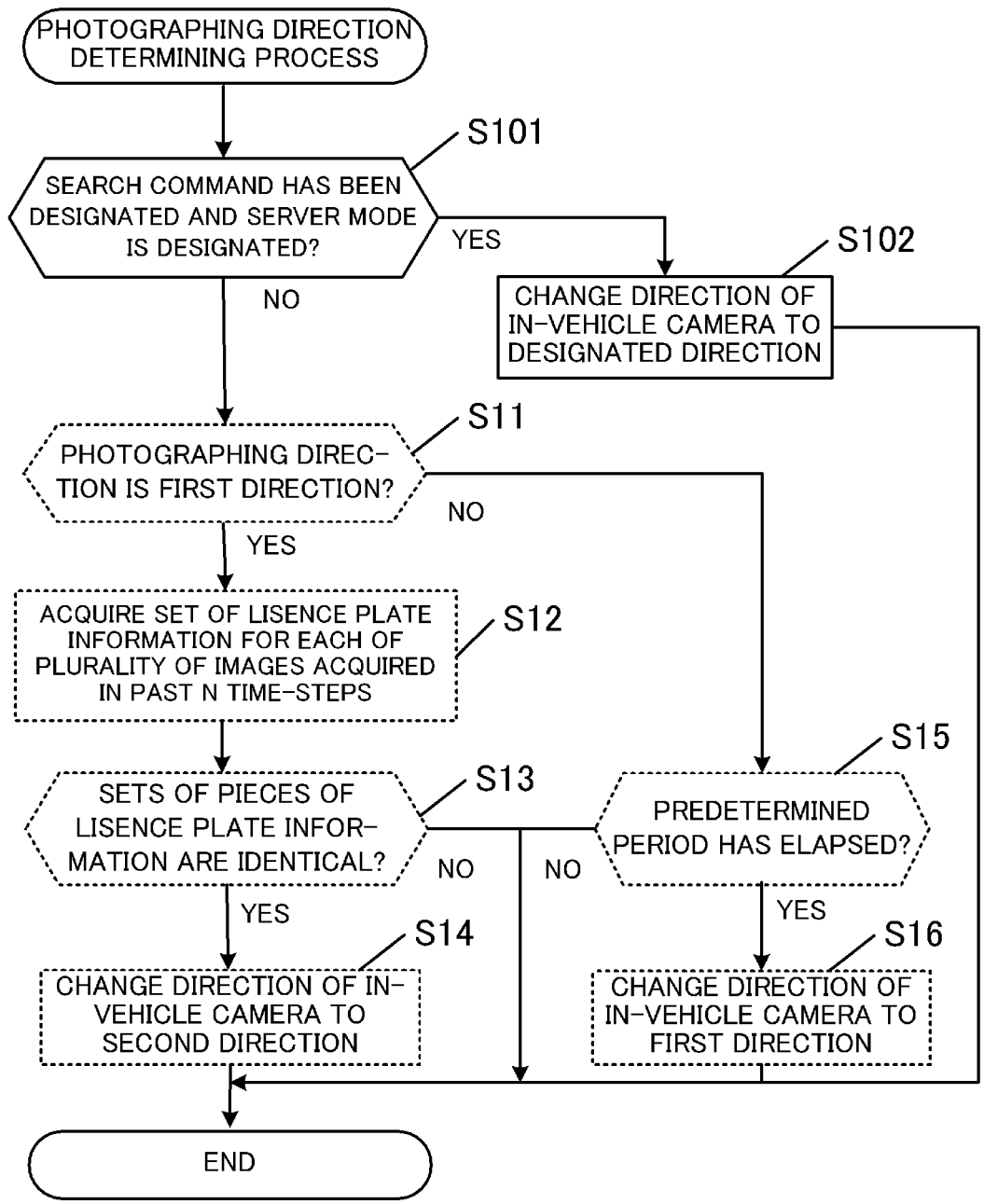
FIG. 12 is a flowchart of a process in which an in-vehicle device determines a photographing direction according to a second embodiment.

FIG. 12 is a flowchart of a process of determining the photographing direction, performed by the in-vehicle device 30 according to the second embodiment. Since the steps indicated by dot lines are similar to those of the first embodiment, the detailed description thereof will be omitted.

In the second embodiment, in step S101, it is determined whether mode designation information that instructs an operation in the server mode has been received from the server device 10. Here, when the mode designation information that instructs an operation in the server mode is received, the flow proceeds to step S102, and a process of changing the photographing direction to a direction indicated by the direction designation information is performed.

As described above, according to the second embodiment, it is possible to control the in-vehicle camera so as to face a direction in which it is easier to grasp the search target vehicle. That is, it is possible to improve the probability to find the search target vehicle.

In the second embodiment, although an example in which the mode designation information and the direction designation information are transmitted together with the search command has been described, these pieces of information may be updated periodically and be transmitted again. For example, a positional relation between the search target vehicle and the vehicle 20 may be calculated periodically, and when conditions are changed, the mode designation information and the direction designation information may be updated and the updated information may be transmitted from the server device 10 to the vehicle 20 as necessary.

Moreover, in the second embodiment, although the position and the traveling direction of the search target vehicle have been estimated on the basis of the stored digest, the position and the traveling direction of the search target vehicle may be estimated according to another method. For example, when where is a vehicle 20 having found the search target vehicle, the position and the traveling direction of the search target vehicle may be estimated using the position information transmitted in step S42.

Modification

The above-described embodiments are examples only, and the present disclosure can be changed appropriately without departing from the spirit thereof.

For example, when the load of the in-vehicle device 30 is high and the process of recognizing the license plate information cannot be performed at a predetermined recognition period, the server device 10 may be requested to perform some of processes. For example, when the amount of processing per unit time exceeds a prescribed amount, an image corresponding to the surplus may be transmitted to the server device 10 so that the process of recognizing the license plate information is performed by the server device 10.

Moreover, in the above-described embodiment, although the vehicle 20 having the function of communicating with the server device 10 performs the search of vehicles, a vehicle (hereinafter, a general-purpose vehicle) which cannot communicate directly with the server device 10 may participate in the search. For example, a search command may be transmitted from the vehicle 20 to a general-purpose vehicle by inter-vehicle communication. There is no particular limitation regarding how the server device 10 will be notified of the fact that the general-purpose vehicle has found a search target vehicle. The finding may be notified to the server device 10 via a vehicle having transmitted the search command and may be notified to the server device 10 via another vehicle. Moreover, the finding may be notified to the server device 10 via a base station other than the vehicles. Moreover, the general-purpose vehicle may transmit a message indicating that the search target vehicle has been detected and may transmit a real-time image.

Note that the processing and units described in the present disclosure may be combined arbitrarily and implemented as long as no technical conflicts occur.

Moreover, a process described as being performed by one device may be distributed to and executed by a plurality of devices. Alternatively, processes described as being performed by different devices may be executed by one device. In a computer system, which hardware configuration (server configuration) will implement each of the functions of the computer system can be changed flexibly.

The present disclosure can be realized in such a way that a computer program that implements the functions described in the embodiments is supplied to a computer and one or more processors included in the computer read and execute the program. Such a computer program may be provided to the computer in the form of a non-transitory computer-readable storage medium connectable to a system bus of the computer and may be provided to the computer via a network. Examples of the non-transitory computer-readable storage medium include magnetic disks (floppy (registered trademark) disks, hard disk drives (HDD), and the like), arbitrary types of discs such as optical discs (CD-ROM, DVD disc, blu-ray disc, and the like), a read-only memory (ROM), a random access memory (RAM), EPROM, EEPROM, a magnetic card, a flash memory, an optical card, and an arbitrary type of medium suitable for storing electronic commands.

What is claimed is:

1. An in-vehicle device comprising:
a direction controller configured to perform control of switching a direction of an in-vehicle camera that photographs an outside of a vehicle to acquire an image between a first direction and a second direction; and
a recognizer configured to recognize license plate information included in the image acquired from the in-vehicle camera, wherein
the direction controller is configured to:
compare first license plate information recognized from an image acquired from the in-vehicle camera at present time point with second license plate information recognized from an image acquired from the in-vehicle camera at predetermined time-steps before the present time point, when the direction of the in-vehicle camera keeps a same direction for a predetermined period or more; and
switch the direction of the in-vehicle camera when the first license plate information and the second license plate information are identical.

2. The in-vehicle device according to claim 1, wherein the direction controller is configured to:
determine whether plurality of pieces of license plate information are identical each other when the direction of the in-vehicle camera is the first direction, the plurality of pieces of license plate information recognized from images, acquired from the in-vehicle camera, at each time point from the predetermined time-steps before the present time point to the present time point;
switch the direction of the in-vehicle camera from the first direction to the second direction when the plurality of pieces of license plate information are identical each other.

3. The in-vehicle device according to claim 1, further comprising:
a transmitter configured to transmit data related to the recognized license plate information to a server device,
a receiver configured to receive direction designation information which is information that designates a direction of the in-vehicle camera from the server device, wherein
the direction controller is configured to switch the direction of the in-vehicle camera according to the direction designation information when the direction designation information is received from the server device.

4. The in-vehicle device according to claim 1, wherein the direction controller is configured to switch the direction of the in-vehicle camera to the first direction when a predetermined period has elapsed after the direction of the in-vehicle camera was switched to the second direction.

5. The in-vehicle device according to claim 1, wherein the direction controller is configured to control the direction of the in-vehicle camera according to any one of a first mode in which the direction of the in-vehicle camera is determined on the basis of a command acquired from a server device and a second mode in which the direction of the in-vehicle camera is determined autonomously.

6. A control method for executed by an in-vehicle device comprising:
performing control of switching a direction of an in-vehicle camera that photographs an outside of a vehicle to acquire an image between a first direction and a second direction;
recognizing license plate information included in the image acquired from the in-vehicle camera, wherein
the control of switching the direction of the in-vehicle camera includes:
comparing first license plate information recognized from an image acquired from the in-vehicle camera at present time point with second license plate information recognized from an image acquired from the in-vehicle camera at predetermined time-steps before the present time point, when the direction of the in-vehicle camera keeps a same direction for a predetermined period or more; and
switching the direction of the in-vehicle camera when the first license plate information and the second license plate information are identical.

7. A non-transitory computer readable storing medium recording a computer program for causing a computer to perform the control method according to claim 6.

* * * * *